(No Model.)
J. F. BARROWS.
TWO WHEELED VEHICLE.
No. 458,514. Patented Aug. 25, 1891.
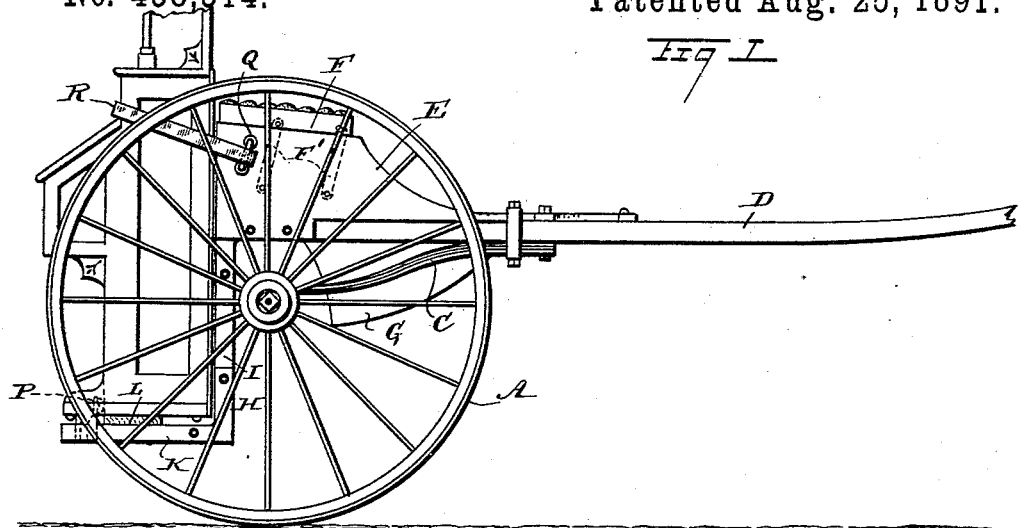
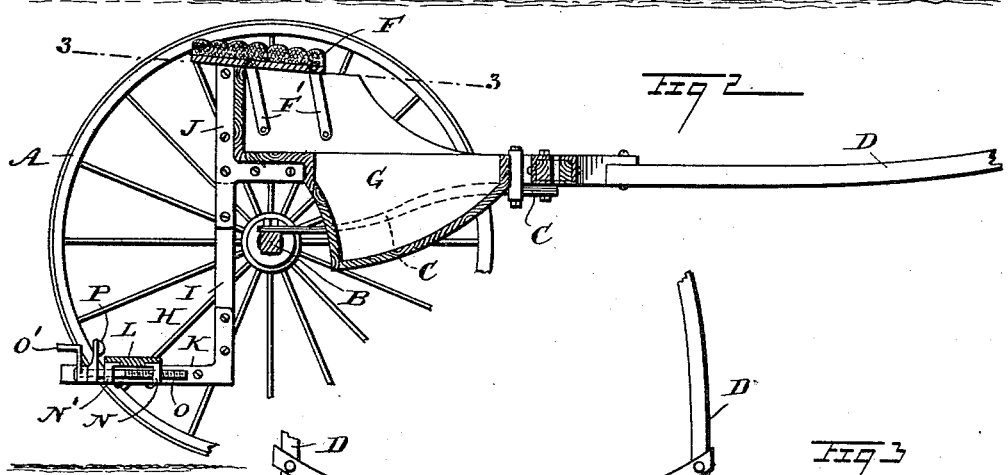
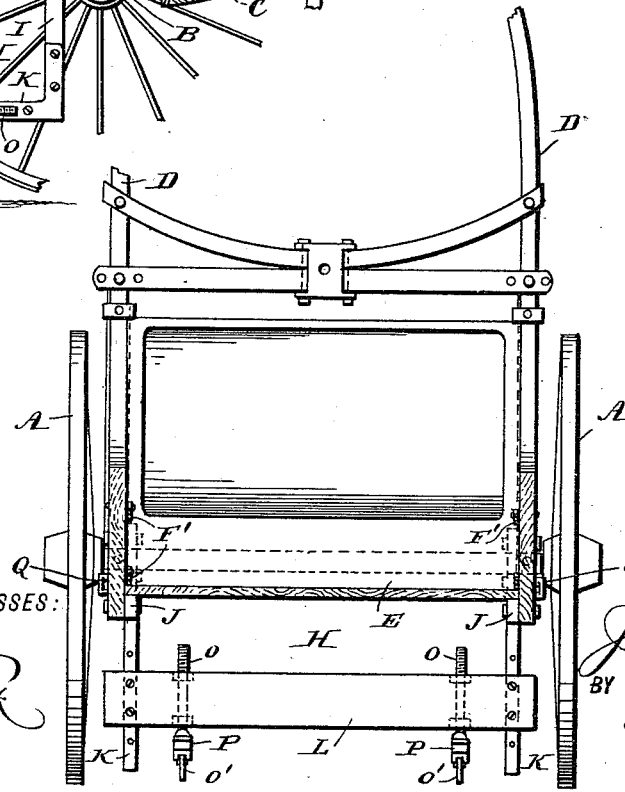
WITNESSES:
H. Walker
C. Sedgwick
INVENTOR:
J. F. Barrows
BY
Munn & Co.
ATTORNEYS

UNITED STATES PATENT OFFICE.

JOHN F. BARROWS, OF SAGINAW, MICHIGAN.

TWO-WHEELED VEHICLE.

SPECIFICATION forming part of Letters Patent No. 458,514, dated August 25, 1891.

Application filed January 10, 1891. Serial No. 377,346. (No model.)

*To all whom it may concern:*

Be it known that I, JOHN F. BARROWS, of Saginaw, in the county of Saginaw and State of Michigan, have invented a new and Improved Two-Wheeled Vehicle, of which the following is a full, clear, and exact description.

The object of the invention is to provide a new and improved two-wheeled vehicle designed for carrying organs, upright pianos, sewing-machines, furniture, and similar articles, and which is simple and durable in construction, permits of easily loading and unloading the articles, and rides very easily.

The invention consists of a frame attached to the vehicle-body in the rear of the axle between the wheels.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement with an organ in place. Fig. 2 is a sectional side elevation of the improvement, and Fig. 3 is a sectional plan view of the same on the line 3 3 of Fig. 2.

The improved two-wheeled vehicle is provided with the two wheels A, mounted on the axle B, on which are clipped the rear ends of the springs C, clipped at their forward ends to the shafts D. The latter support above the axle B the vehicle-body E, provided with a seat F, adapted to be moved in a forward or rearward position, as illustrated in Figs. 1 and 2, the said seat being hung for this purpose on parallel arms F', pivoted to the seat and the vehicle-body E. The latter is also provided with a downwardly-extending foot-box G.

The vehicle-body E supports at its rear end a frame H, adapted to carry the article to be transported, the said frame extending in the rear of the axle B and between the two wheels A. The frame H is provided with two upright bars I, secured to brackets J, fastened to the rear of the vehicle-body E, as is plainly illustrated in Fig. 2. On the lower ends of the bars I are secured horizontally-extending arms K, connected with each other by a foot-board L, on which the article to be carried rests. On the under side of the foot-board L are arranged two sets of nuts and bearings N and N', respectively, in each set being mounted to turn a screw-rod O, carrying at its outer end a crank-arm O' for conveniently turning the said screw-rods to move the latter forward and backward, as desired. Each of the screw-rods carries next to the crank-arm O' a cushioned arm P, held loosely on the screw-rod and adapted to be moved by the crank-arm O' against the article to be carried, so as to lock the same in place on the frame H, as is plainly shown in Fig. 1.

On the sides of the vehicle-body E are secured staples Q, adapted to be connected with the ends of a strap R, passing around the article to be carried near its upper end, as is plainly indicated in Fig. 1. The horizontal arms K of the frame H extend within a short distance of the ground on which the wheels A travel, so that the article to be carried can be readily loaded onto the frame H or taken off from it in unloading. It is understood that the said arms K are sufficiently high above the ground as not to strike ordinary obstructions in the roadway.

The frame H can at any time be readily detached from the brackets J, so that the two-wheeled vehicle can be used as an ordinary road-cart. In this case the seat F is swung into a rearmost position, as illustrated in Fig. 2.

The article to be carried by the two-wheeled vehicle is first placed onto the transverse board L, so that the casters of the article hang at the sides of the board, while the back of the article rests against the upright bars I and also against the brackets J at the back of the vehicle-body E. The operator then moves the loosely-cushioned arms P into an uppermost position and then turns the crank-arms O', so as to move the said cushioned arms against the front of the article to be carried to lock the lower part of the same in place. The strap R is then passed around the upper part of the article to be carried and buckeled up or fastened in any other suitable manner.

When the driver is in his place on the seat F and the article is loaded on the frame H, then the two-wheeled vehicle is well balanced, so as to take off nearly all strain from the animal in the shafts D. It requires very little power or exertion from the animal to draw a heavy organ or upright piano from one place to another on such a vehicle. It furthermore permits of readily loading or unloading, as previously described.

It will be seen that by connecting the axle rigidly with the springs and the latter with the shafts the disagreeable jogging motion usually found in road-carts is entirely overcome and an easy riding can be had.

Having thus fully described my invention, I claim as new and desire to secure by Letters Patent—

1. In a two-wheeled vehicle, the combination, with the body, of a right-angled frame depending from the body in rear of the axle and between the wheels, and an adjustable clamp carried by the frame for securing the article supported on the frame, substantially as described.

2. In a two-wheeled vehicle, a frame arranged at the rear of the axle between the wheels and comprising upright bars connected with the vehicle-body, horizontal arms extending from the lower ends of the said bars, a board connecting the said horizontal arms with each other, and an adjustable cushioned arm held on the said transverse board to lock the article in place, substantially as shown and described.

3. In a two-wheeled vehicle, the combination, with the axle and shafts, of springs having their rear ends secured to the axle and their forward ends to the shafts, a body supported by the shafts, and a right-angled frame depending from the body in rear of the axle and between the wheels, substantially as described.

4. In a two-wheeled vehicle, the combination, with the axle and shafts, of springs having their forward ends secured to the shafts and their rear ends to the axle, a body supported by the shafts, a right-angled frame depending from the body in rear of the axle and between the wheels, and means for securing an article on the said frame, substantially as described.

5. In a two-wheeled vehicle, the combination, with the body and a frame depending from the same between the wheels, of a seat pivotally connected to the body, whereby provision is made for adjusting the seat forward or backward, as and for the purpose set forth.

JOHN F. BARROWS.

Witnesses:
   JOHN H. STOELKU,
   EARLE A. WILLIAMS.